United States Patent
King et al.

(10) Patent No.: US 10,120,552 B2
(45) Date of Patent: Nov. 6, 2018

(54) ANNOTATING COLLABORATIVE CONTENT TO FACILITATE MINING KEY CONTENT AS A RUNBOOK

(71) Applicant: International Business Machines Corporation, Armonk, NY (US)

(72) Inventors: Richard A. King, Cary, NC (US); Shrenik S. Shah, Raleigh, NC (US); Robert T. Uthe, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 360 days.

(21) Appl. No.: 14/865,111

(22) Filed: Sep. 25, 2015

(65) Prior Publication Data
US 2017/0090736 A1    Mar. 30, 2017

(51) Int. Cl.
*G06F 3/0484* (2013.01)
*G06F 17/24* (2006.01)
*G06F 17/21* (2006.01)
*G06Q 10/00* (2012.01)
*G06Q 10/10* (2012.01)

(52) U.S. Cl.
CPC ...... *G06F 3/04847* (2013.01); *G06F 3/04842* (2013.01); *G06F 17/218* (2013.01); *G06F 17/241* (2013.01); *G06Q 10/00* (2013.01); *G06Q 10/101* (2013.01)

(58) Field of Classification Search
CPC ............. G06F 3/04847; G06F 3/04842; G06F 17/241; G06F 17/28
USPC .......................................................... 715/232
See application file for complete search history.

(56) References Cited

U.S. PATENT DOCUMENTS

| | | | | |
|---|---|---|---|---|
| 5,008,853 A | * | 4/1991 | Bly | G06Q 10/10 345/2.1 |
| 7,370,269 B1 | * | 5/2008 | Prabhu | G06F 17/30873 715/201 |
| 7,962,853 B2 | * | 6/2011 | Bedi | G06F 17/248 709/206 |
| 8,060,820 B2 | * | 11/2011 | Bedi | G06Q 10/107 715/255 |
| 8,082,277 B1 | * | 12/2011 | O'Brien | G06Q 10/101 707/758 |
| 8,417,666 B2 | * | 4/2013 | Bailor | G06F 17/24 707/608 |

(Continued)

OTHER PUBLICATIONS

Chakklamattam J. Paul, et al.,"Identifying Changes in Multiple Resources Related to a Problem," U.S. Appl. No. 14/865,103, filed Sep. 25, 2015.

(Continued)

*Primary Examiner* — Daeho D Song
(74) *Attorney, Agent, or Firm* — Cantor Colburn LLP; Richard Wilhelm

(57) ABSTRACT

Aspects include methods, systems, and computer programs to tag collaborative content to facilitate mining key content as a run book. The method includes providing a user interface allowing a user to annotate portions of content in a collaborative effort system, the content comprising one or more log elements and responsive to a user utilizing the user interface and selecting a log element in the content, tagging the selected log element with an annotation. The tagged log elements may be used to generate a runbook.

16 Claims, 6 Drawing Sheets

(56) References Cited

U.S. PATENT DOCUMENTS

| | | | | |
|---|---|---|---|---|
| 8,533,608 | B1* | 9/2013 | Tantiprasut | G06Q 10/06 715/751 |
| 8,625,769 | B1* | 1/2014 | Allen | 348/14.08 |
| 8,701,018 | B1* | 4/2014 | Keel | G06F 17/3087 715/751 |
| 8,731,989 | B2* | 5/2014 | Al-Ahaidib | G06Q 10/06311 705/7.21 |
| 9,542,292 | B2* | 1/2017 | Sievert | G06F 11/3072 |
| 9,690,785 | B1* | 6/2017 | Vagell | G06F 17/30011 |
| 9,819,547 | B2* | 11/2017 | Maini | H04L 41/0883 |
| 2002/0083079 | A1* | 6/2002 | Meier | G06F 19/00 |
| 2003/0167443 | A1* | 9/2003 | Meunier | G06F 17/30899 715/255 |
| 2004/0059783 | A1* | 3/2004 | Kazui | G06F 17/30817 709/205 |
| 2004/0085354 | A1* | 5/2004 | Massand | G06F 17/2229 715/751 |
| 2005/0081139 | A1* | 4/2005 | Witwer | G06F 17/30705 715/234 |
| 2005/0289088 | A1* | 12/2005 | Tian | G06F 8/20 706/1 |
| 2007/0044076 | A1* | 2/2007 | Allen, Jr. | G06F 17/30716 717/123 |
| 2007/0192155 | A1* | 8/2007 | Gauger | G06Q 10/00 705/301 |
| 2007/0250901 | A1* | 10/2007 | McIntire | H04N 7/17318 725/146 |
| 2008/0250007 | A1* | 10/2008 | Masuyama | G06F 17/30616 |
| 2009/0019367 | A1* | 1/2009 | Cavagnari | G06F 21/62 715/716 |
| 2011/0228921 | A1* | 9/2011 | Singh | H04L 12/1831 379/202.01 |
| 2011/0258526 | A1* | 10/2011 | Supakkul | G06F 17/241 715/230 |
| 2012/0284516 | A1* | 11/2012 | Errico | G06F 21/32 713/168 |
| 2012/0303772 | A1* | 11/2012 | Ennis | G06N 5/02 709/223 |
| 2013/0224714 | A1 | 8/2013 | Ajmera et al. | |
| 2013/0232463 | A1* | 9/2013 | Nagaraja | G06F 8/61 717/101 |
| 2013/0304742 | A1* | 11/2013 | Roman | G06F 17/30598 707/740 |
| 2014/0068348 | A1 | 3/2014 | Mondal et al. | |
| 2014/0223416 | A1* | 8/2014 | Cohen | G06F 11/3476 717/123 |
| 2015/0142825 | A1* | 5/2015 | Deshmukh | G06N 5/022 707/748 |
| 2015/0188768 | A1* | 7/2015 | Maini | H04L 41/0883 709/224 |
| 2017/0011322 | A1* | 1/2017 | Thomas | G06Q 10/067 |

OTHER PUBLICATIONS

List of IBM Patents or Patent applications Treated as Related; Date Filed: Sep. 25, 2015, pp. 1-2.

Mustansir Ali, et al.,"Tracking and Managing Items in a Collaborative Exchange", U.S. Appl. No. 14/865,129, filed Sep. 25, 2015.

Robert T. Uthe,"Enabling a Multi-Dimensional Collaborative Effort System", U.S. Appl. No. 14/865,148, filed Sep. 25, 2015.

* cited by examiner

ANNOTATING COLLABORATIVE CONTENT TO FACILITATE MINING KEY CONTENT AS A RUNBOOK

BACKGROUND

The present invention relates to problem solving, and more specifically, to methods and systems to annotate collaborative content to facilitate mining of key content.

Within systems management, problems may arise that may require collaborative efforts to resolve. In some instances, as a problem is worked, i.e., a solution is attempted to be reached, lower-skilled employees may attempt to resolve the problem first following a set of instructions described in a runbook. A runbook may provide a sequence of steps to follow or may include actions that will run some automated task and provide the result to the user. If the problem cannot be resolved by the runbook, skilled persons may be required to address the problem. In some instances, a new runbook may need to be created.

Creating new runbooks may be problematic. This is because runbooks need to be created by expert(s) in a given area whose time is scarce, where creating a runbook first requires prioritizing their time. This may provide a substantial roadblock in the ability to create a volume of runbooks that are sufficient for problems. Further, when a given problem, and thus associated runbook, spans a number of various different domains (i.e., a mixture of database and/or application and/or application server) it may be difficult to bring all of these experts together at the same time to draft a sufficient runbook to address the problem.

SUMMARY

According to embodiments of the present invention, methods, systems, and computer program products are provided for tagging collaborative content to facilitate mining key content as a run book. The method includes providing a user interface allowing a user to annotate portions of content in a collaborative effort system, the content comprising one or more log elements and responsive to a user utilizing the user interface and selecting a log element in the content, tagging the selected log element with an annotation. The tagged log elements may be used to generate a runbook.

DETAILED DESCRIPTION

Figure 1:
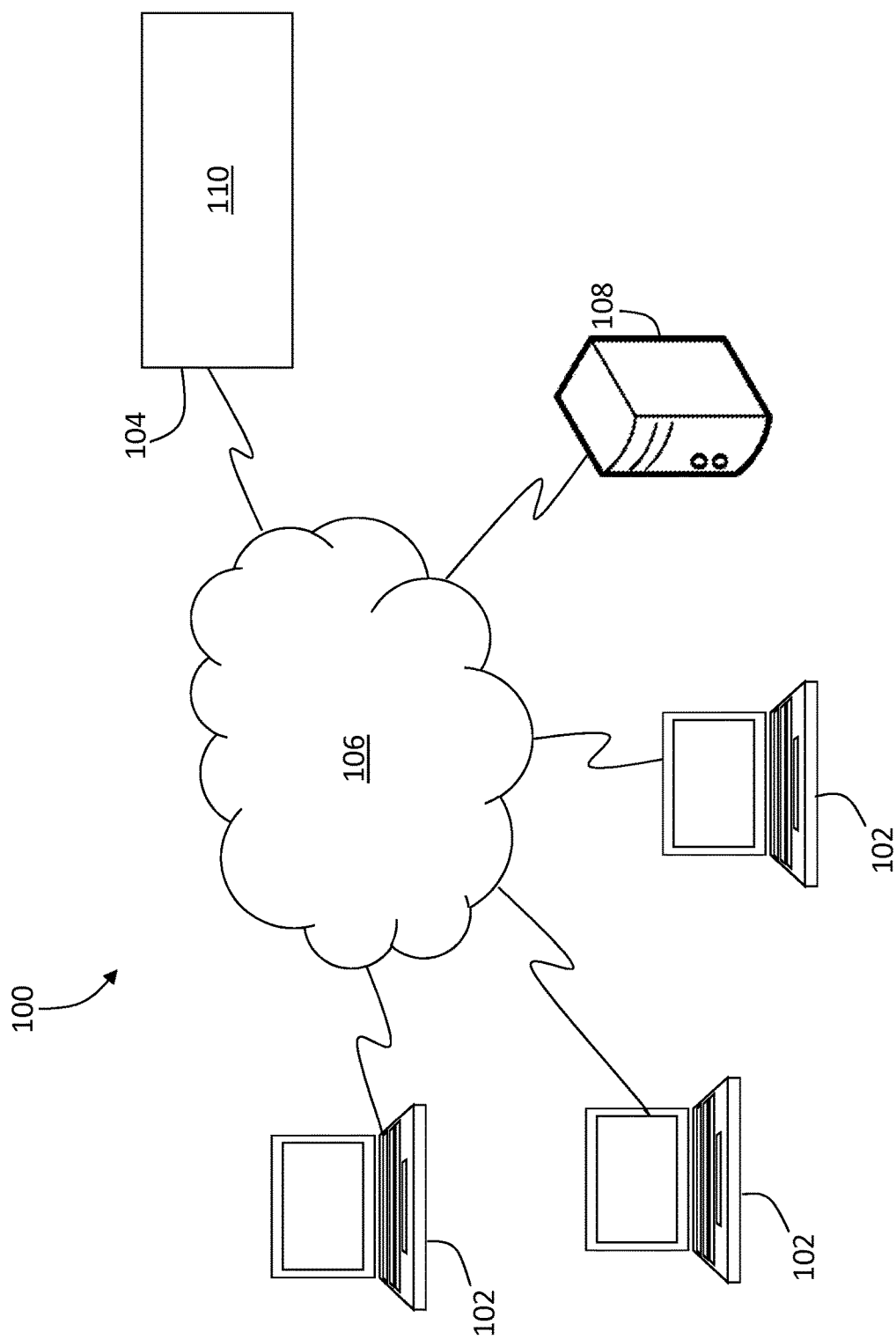
FIG. 1 depicts a block diagram of a system for enabling collaborative efforts to generate collaborative content in accordance with an embodiment.

Various embodiments described herein provide systems and processes for tagging and/or mining key content from the content of a collaborative effort or system, such as a war room, chat room, dialogue program, social network, etc. Further, various embodiments described herein provide extracting and/or aggregating the key content to form a runbook based on the key content. Further, various embodiments described herein provide systems and processes for tagging data in the collaborative effort or system such that the tagged data may be sorted, processed, manipulated, handled, etc. during and/or after the collaborative effort is completed.

As problems arise in various systems, an attempt may be made to resolve the problem with a runbook, i.e., using a set of predefined or predetermined instructions, actions, and/or steps to perform to resolve the issue. The runbook may be a pre-existing process or instruction manual that has been tested and ensured for solving a variety of problems related to one or more systems and problems associated with the one or more systems. If an existing runbook does not provide a solution to the problem in the system, the problem may be routed to one or more subject matter experts (SME). As applications and systems have increased in complexity, multiple SMEs may participate to collectively and collaboratively figure out where a given problem lies and how to fix it. That is, multiple SMEs (or other persons) may perform a collaborative effort to define a problem, identify where the problem exists, and find a resolution to the problem. In high pressure problems it may not be uncommon to have upward of twenty-five or more people collaborating to solve a single problem.

One option to enable a collaborative effort is the use of group chat and/or networking, which may be the basis for group collaboration in a "virtual war room" capability. As used herein, the term "collaborative effort system" will be used to refer to a group chat, virtual war room, instant messaging, short message services, blog, website, online community, news feed, email, wild, etc., or other social or collaborative application, process, and/or system. The collaborative effort system may contain the dialog of interactions back and forth between several SMEs and other persons as they chase leads and ultimately uncover key symptoms of the problem. The collaborative effort system may also include the discussion that the SMEs and other persons have when they find or identify the problem and the actions they took in response to the problem, whether the actions were successful or not. That is, the collaborative effort system will thus contain all of the information uncovered through the problem-resolution cycle that is performed by the SMEs. This information may include hundreds or thousands of messages spanning not only the ultimate resolution to the problem, but may include all of the details about the paths and options investigated and subsequently cleared of being a cause of the problem and/or potential solutions that were not completed or sufficient to solve the problem adequately.

In accordance with some embodiments provided herein, a lightweight process to annotate or tag items relevant in the discussion within a collaborative effort system is provided. The relevant items may include identification of the problem, identification of key symptoms, identification of potential solutions, identification of related systems or applications, or other information that may be useful in resolving the problem when it arises in the future. Hereinafter the relevant items will be referred to as "key content."

Referring to FIG. 1, a block diagram of a system 100 for enabling a collaborative effort system and annotating and/or tagging portions of a discussion in accordance with an embodiment is shown. The system 100 includes a chat or discussion application, hereinafter collaborative effort system 110, for performing the processing described herein that is executed by one or more computer programs located on a host system 104 and/or a user system(s) 102.

The system 100 depicted in FIG. 1 includes one or more user systems 102 through which users, e.g., SMEs and other persons, at one or more geographic locations may contact the host system 104 to initiate programs and/or participate in the collaborative effort system 110. The user systems 102 are coupled to the host system 104 via a network 106. Each user system 102 may be implemented using a general-purpose computer executing a computer program for carrying out the processes described herein. The user systems 102 may be user devices such as personal computers (e.g., a laptop, a tablet computer, a cellular telephone, etc.) or host attached terminals. If the user systems 102 are personal computers, in some embodiments, the processing described herein may be shared by a user system 102 and the host system 104. The user systems 102 may also include game consoles, network management devices, and field programmable gate arrays. In addition, multiple user systems 102 and/or host systems 104 may be concurrently operating to aggregate web interactions for personalized usage.

The network 106 may be any type of known network including, but not limited to, a wide area network (WAN), a local area network (LAN), a global network (e.g. Internet), a virtual private network (VPN), a cloud network, and an intranet. The network 106 may be implemented using a wireless network or any kind of physical network implementation known in the art. A user system 102 may be coupled to the host system through multiple networks 106 (e.g., cellular and Internet) so that not all user systems 102 are coupled to the host system 104 through the same network 106. One or more of the user systems 102 and the host system 104 may be connected to the network 106 in a wireless fashion. In one non-limiting embodiment, the network is the Internet and one or more user systems 102 execute a user interface application (e.g. a web browser) to contact the host system 104 through the network 106. In another non-limiting example embodiment, the user system 102 is connected directly (i.e., not through the network 106) to the host system 104. In a further non-limiting embodiment, the host system 104 is connected directly to or contains a storage device 108.

The storage device 108 includes data relating to the collaborative effort system 110 and/or data relating to a problem to be solved. In some embodiments, the storage device 108 may be implemented using a variety of devices for storing electronic information. In an example embodiment, data stored in the storage device 108 includes, but is not limited to, one or more search data and search history databases, and other data utilized by embodiments described herein. It is understood that the storage device 108 may be implemented using memory contained in the host system 104 or that it may be a separate physical device. The storage device 108 may be logically addressable as a consolidated data source across a distributed environment that includes the network 106. Information stored in the storage device 108 may be retrieved and manipulated via the host system 104 and/or via a user system 102.

The host system 104 depicted in FIG. 1 may be implemented using one or more servers operating in response to a computer program stored in a storage medium accessible by the server. The host system 104 may operate as a network server (e.g., a web server) to communicate with the user system 102. The host system 104 handles sending and receiving information to and from the user system 102 and can perform associated tasks. The host system 104 may also include a firewall to prevent unauthorized access to the host system 104 and enforce any limitations on authorized access, e.g., permitting only designated SMEs and/or other authorized persons to access the collaborative effort system 110. For instance, an administrator may have access to the entire system and have authority to modify portions of the system and/or permissions thereto. A firewall may be implemented using conventional hardware and/or software as is known in the art.

The host system 104 may also operate as an application server. The host system 104, in such embodiments, may execute one or more computer programs, including the collaborative effort system 110, to provide aspects of embodiments as described herein. Processing may be shared by the user system 102 and the host system 104 by providing an application to the user system 102. Alternatively, the user system 102 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

During a collaborative effort, one or more users, e.g., SMEs and other persons, may use a user system 102 to communicate through the network 106 and participate in a discussion on the host system 104 employing the collaborative effort system 110.

Figure 2:
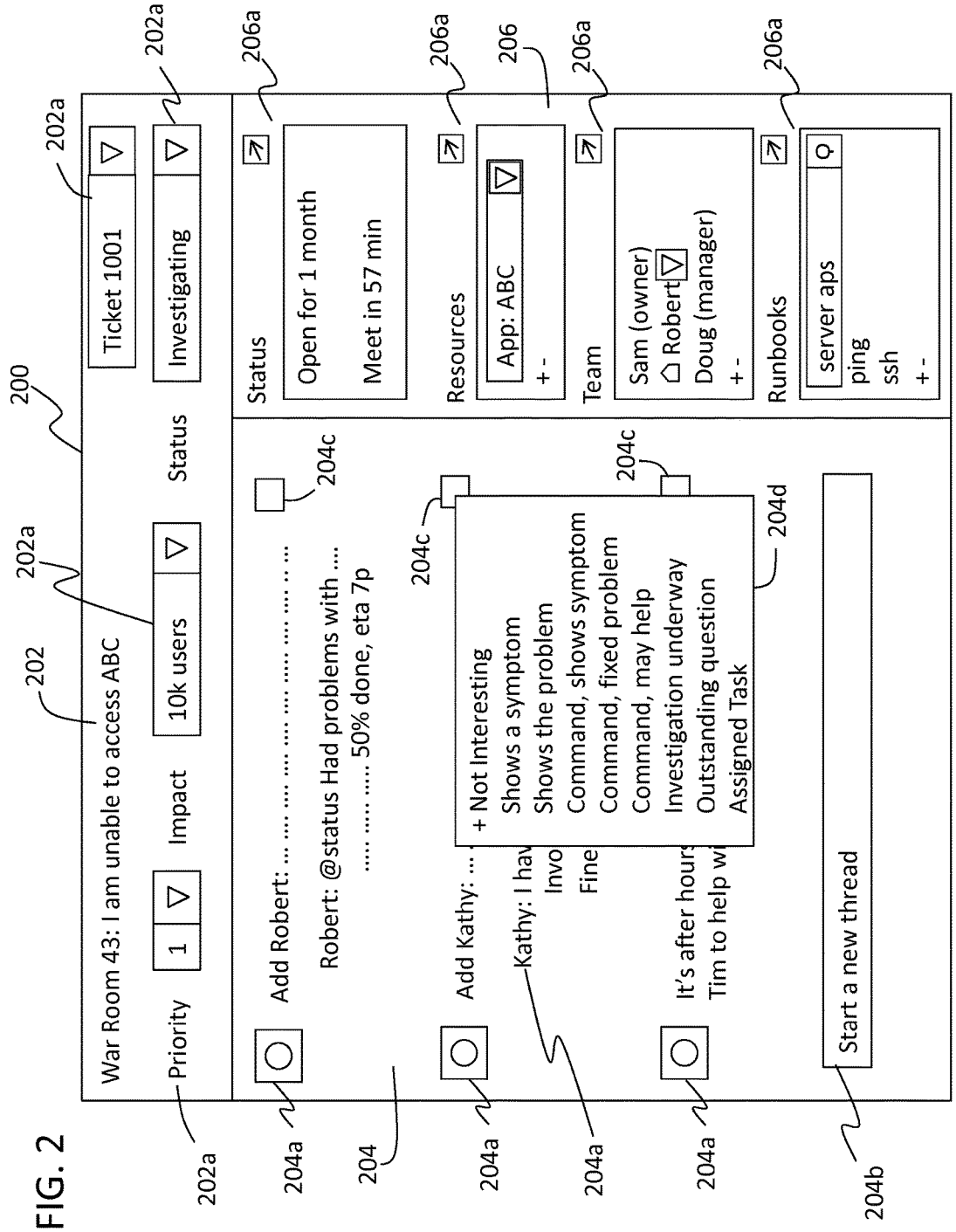
FIG. 2 depicts an illustrative view of a user interface of a collaborative application incorporating features in accordance with an embodiment.

Turning to FIG. 2, a non-limiting example of a collaborative effort system user interface incorporating an example embodiment of the present disclosure is shown. User interface 200 may be a visual representation of the collaborative effort system 110 presented on a user device 102 as executed by a host system 104. User interface 200 may include one or more windows configured to provide functionality and/or information therein. For example, a first window 202 may provide general information about the particular collaborative effort system, a second window 204 may provide information and contain content regarding the process to reach a solution to the problem, and a third window 206 may provide additional information and/or options within the user interface 200. Each of these example potential windows of the non-limiting embodiment will now be described.

The first window 202 may provide general information about the particular collaborative effort system. As shown, first window 202 includes a war room number ("war room 43") and a description of the general problem to be solved within war room 43: "I am unable to access ABC." ABC may be a program, application, server, website, and/or other virtual or physical element that may be subject to one or more problems. Also included in the first window 202 may be one or more modifiable fields 202a that provide additional general information related to the problem, including, but not limited to priority, status, impact, etc. As shown, FIG. 2 indicates a matter number "ticket 1001." Additionally, a priority field is present, and as shown is indicated as "Priority 1." Impact information may also be provided, indicating the impact of the identified problem, and here is shown as 10,000 users are impacted. Finally, as shown, first window 202 may include a status field that indicates the status of the progress on the problem, and is shown as "investigating." Those of skill in the art will appreciate that the first window 202 may include other fields, information, etc. and/or combinations thereof.

The second window 204 may provide information and contain content regarding the process to reach a solution to the problem. That is, the second window 204 may be a log of the process including the content of the collaborative effort submitted by users of the collaborative effort system. The content may be represented by one or more log elements 204a that are located within the second window 204. The log elements 204a may be threads, comments, entries provided by users, pictures, URL links, etc., hereinafter "content." For example, each log element 204a may be a thread that addresses one sub-problem, a comment directed to a specific user, thoughts and conversations, etc., or combinations thereof. Alternatively, or in combination, log elements 204a may be each entry within the collaborative effort system within the second window 204. Each log element 204a may be an entry in the collaborative effort system in interface 200 that has already been submitted. The log elements 204a thus form the content of the collaborative effort system.

New log elements 204a may be created by a user interacting with an entry element 204b. Entry element 204b may be configured to allow users to type information into the second window 204, such as provide a comment or to add a new thread and comments therein. The entry element 204b is how a user may generate a new log element 204a, thus expanding the content within the collaborative effort system.

In accordance with embodiments described herein, each log element 204a may be provided with an associated tagging element 204c. The tagging element 204c may be a check-box, drop-down menu, or other interactive feature that may enable a user to tag the associated log element 204a with a designated tag. In some embodiments, the tagging element 204c may allow a user to indicate a relevancy of portions of the communications, i.e., content of the collaborative effort system.

As shown in FIG. 2, the tagging element 204c, when selected, may provide one or more options in an annotating element 204d to tag the associated log element 204a. That is, a user may determine and select a tag or indicator to be associated with the log element 204a, thus indicating the relevancy of the particular selected log element 204a. In the non-limiting example of FIG. 2, the annotating element 204d provides options including: (1) not interesting, (2) shows a symptom, (3) shows the problem, (4) command, shows symptom, (5) command, fixed problem, (6) command, may help, (7) investigation underway, (8) outstanding question, (9) assigned task. As will be appreciated by those of skill in the art, the options shown in FIG. 2 for the annotating element 204d are merely for example and other options and/or combinations thereof may be provided and/or employed without departing from the scope of the present disclosure. For example, other tagging options for the annotating element 204d may include options including status, procedural step, scope of applicability, context, etc. Further, tags or options within the annotating element 204d may be defined in-process to help fit different processes that users may follow or to fit various circumstances of the particular collaborative effort system and/or problem being addressed.

In accordance with some embodiments, by default each log element 204a and associated tagging element 204c may be automatically designated or pre-designated as "not interesting." However, one or more users, ranging from selected individuals to all participants in the collaborative effort system, may be able to change the tagging/annotation to tag specific log elements 204a of significance. For example, users may use the annotating element 204d to identify items/entries of the log elements 204a that help define the problem better, or identify any content, e.g., log element 204a, significant that aided in the diagnosis and resolution of the problem. Further, where specific commands, e.g., a log element 204a that is a code or command line, are included in the collaborative effort system, the commands can be tagged for significance as well. Furthermore, in some non-limiting embodiments, various log elements 204a may be tagged with one or more annotating elements 204d, such that a log element 204a may have multiple annotating elements 204d associated therewith.

The third window 206 may provide additional information and/or options within the user interface 200. For example, as shown, the third window 206 may include supporting elements 206a. One supporting element 206a may be a status element that indicates the duration of the problem, e.g., when the problem was identified, and may also include milestone or event timers such as indicators when meetings or calls may be required of the users of the collaborative effort system. Supporting elements 206a may also include links or other methods of retrieving and/or accessing information, programs, etc. that are outside of the interface 200 and/or outside of the collaborative effort system. For example, a supporting element 206a may provide direct access for a user to access operational or ownership details of an application shown here as "App: ABC." Supporting elements 206a may also include a listing of the users, e.g., the SMEs and other persons involved with the project/problem, and further may enable direct contact between one or more specific users. For example, a supporting element 206a may enable a direct messaging service to users of the collaborative effort system. Other user-specific information may be provided within the supporting elements 206a, such as user position, user access, company affiliation, etc. Further, links to runbooks or other pre-existing material that are associated with the problem and/or associated with systems, elements, etc. associated with the program or other systems that includes the problem may be provided in supporting elements 206a.

Although a single configuration of a user interface 200 of a collaborative effort system is shown herein, those of skill in the art will appreciate that the user interface 200 may take any number of formats and/or configurations. For example, in some embodiments, the user interface 200 may comprise a single window with multiple aspects thereto and/or all of the above describe capabilities may be configured within a single window or application user interface. In other embodiments, each window may be a separate feature of the collaborative effort system. Thus, the illustration of FIG. 2 is not intended to be limiting but rather is provided for illustrative and discussion purposes.

In some embodiments, tags and/or annotations to the content may be configured to be suitable to reflect status content, rather than applicability to solving the problem. For example, during a real-time collaborative effort system process, there may be checkpoints or status update requirements to be provided to management personnel regarding progress of the problem. Further, for example, tagging and annotating may be used to identify or indicate a particular user associated with a particular problem. That is, in some embodiments, the tagging/annotating feature may be used to highlight specific questions, tasks, etc. for a particular user of the collaborative effort system, and the user may be able to filter the log elements 204a within the collaborative effort system based on the annotating element 204d selected for each log element 204a to identify items specifically tagged for the user's attention. In accordance with some embodiments, the content may be maintained in a log or history, thus enabling use of status-oriented type tags, e.g., #status. Such status-oriented tags may enable a status meeting on each item related to the problem. That is, the collaborative effort system could filter and indicate status items as new/changed from a prior status meeting. Accordingly, the tagging and annotating described herein may be used as an in-process tool to assist users in understanding and tracking the status of various aspects of the problem-resolution process within the collaborative effort system.

Furthermore, in some embodiments, tagging could be scoped to a given comment in the discussion, i.e., to specific content, or the tagging may be used to mark or highlight an area of text or a stanza thereof, such that the tagging applies only to a specific portion of the content. That is, the tagging may not only apply to an entire log element 204, but also may be configured to apply to a selected sub-portion of a log element 204a, or may be configured to apply to multiple log elements 204a collectively.

Advantageously, in this manner, not only may a discussion be conducted within a collaborative effort system, but content that may be identified as significant may be tagged and/or categorized within the collaborative effort system. When the problem has been resolved, a user can close the collaborative effort system and perform additional tasks.

Figure 3A:
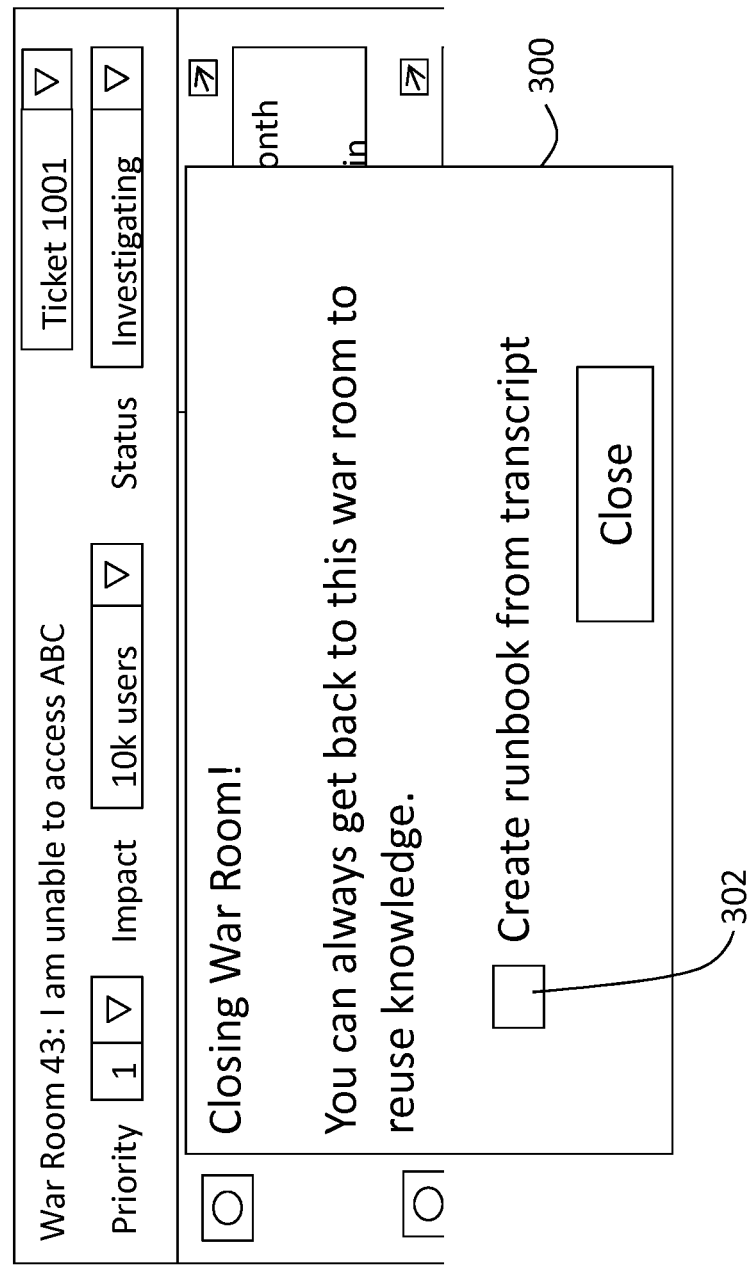
FIG. 3A depicts an illustrative view of a user interface dialog box in accordance with an embodiment.

Turning now to FIG. 3A, an illustration of the closing function of a user interface of a collaborative effort system as described herein is shown. In FIG. 3A, a dialog box 300 is shown providing a confirmation that the collaborative effort system is being closed and additional commentary and/or information are provided therein. When closed, the collaborative effort system may form or generate a complete log, content history, transcript, etc. of the content of the discussion that was conducted within the collaborative effort system. The dialog box 300 may also include an option 302 to create a runbook based on the tagging during the discussion and collaborative effort performed within the collaborative effort system. That is, a user, when closing the discussion within the collaborative effort system (after resolving a problem) may automatically have a runbook generated from the discussion based on the tagging.

In accordance with a non-limiting embodiment, if the user elects to create a runbook, i.e., selects option 302, the user may be presented with the set of tags used in the collaboration/discussion within the collaborative effort system. For example, the user may be presented with the list of items from the annotating element 204d shown in FIG. 2. As such, a user can select the tags, annotations, or indicators that are associated with elements that a user would want included in a runbook. In some embodiments, the system may preselect tags, annotations, or indicators known to mimic the problem-resolution process. With the selection of the appropriate and/or desired tags/indicators, the content having at least one of the desired tags/indicators may be extracted and formed into a runbook. In some embodiments, the content may be ordered oldest to newest. In other embodiments, if a weighting scale is provided as a feature of the annotating element, the content may be ordered by the weighting scale and/or the time of entry into the discussion.

The process of extracting the desired or key content may be performed with a rule-based algorithm applied to the content of the collaborative effort system. That is, the algorithm may mine the information from the content and the associated tags of the content. The output of the algorithm may be a runbook.

Figure 3B:
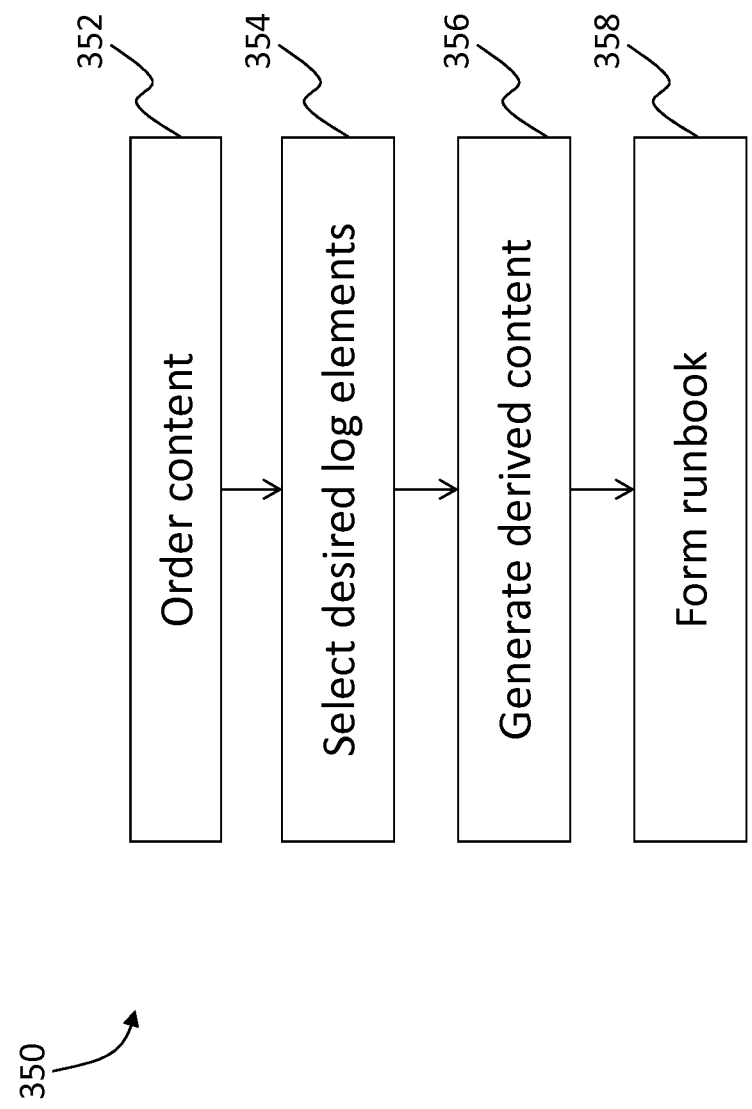
FIG. 3B depicts a flow process of mining data in accordance with an embodiment.

Turning to FIG. 3B, the process performed when option 302 is selected is shown. That is, FIG. 3B is a process 350 for mining data from the content of the collaborative effort system. In one non-limiting example, the rule based algorithm may order the content from the entire collaborative effort system (step 352), such as discussions, threads, etc. The ordering may be time-ordering the sequence of content generated within the collaborative effort system. Next, the algorithm may derive information from identified sequences of attempted solutions to form a derived information set. That is, the algorithm may select log elements within the content that are associated with a desired tag (step 354) and then extract or generate derived information based on the specific tagged log elements (step 356). The output may be a list of the selected content, and may be used to form a runbook (step 358).

In an alternative embodiment and/or in combination with the above described process, the tagging may be performed automatically by the collaborative effort system. For example, in some embodiments, a user may not tag the log entries, but when the collaborative effort system is closed, a process and/or algorithm may be performed. For example, a natural language process (NLP) and analytic analysis may be applied to the content of the collaborative effort system. Log elements of the content may then be identified by the NLP and analytic analysis to tag or apply annotations to various log elements or portions thereof. The tagged and/or annotated log elements may then be presented to a user in a user interface for review and/or approval. The approved log elements may then be used to form a runbook.

Figure 4:
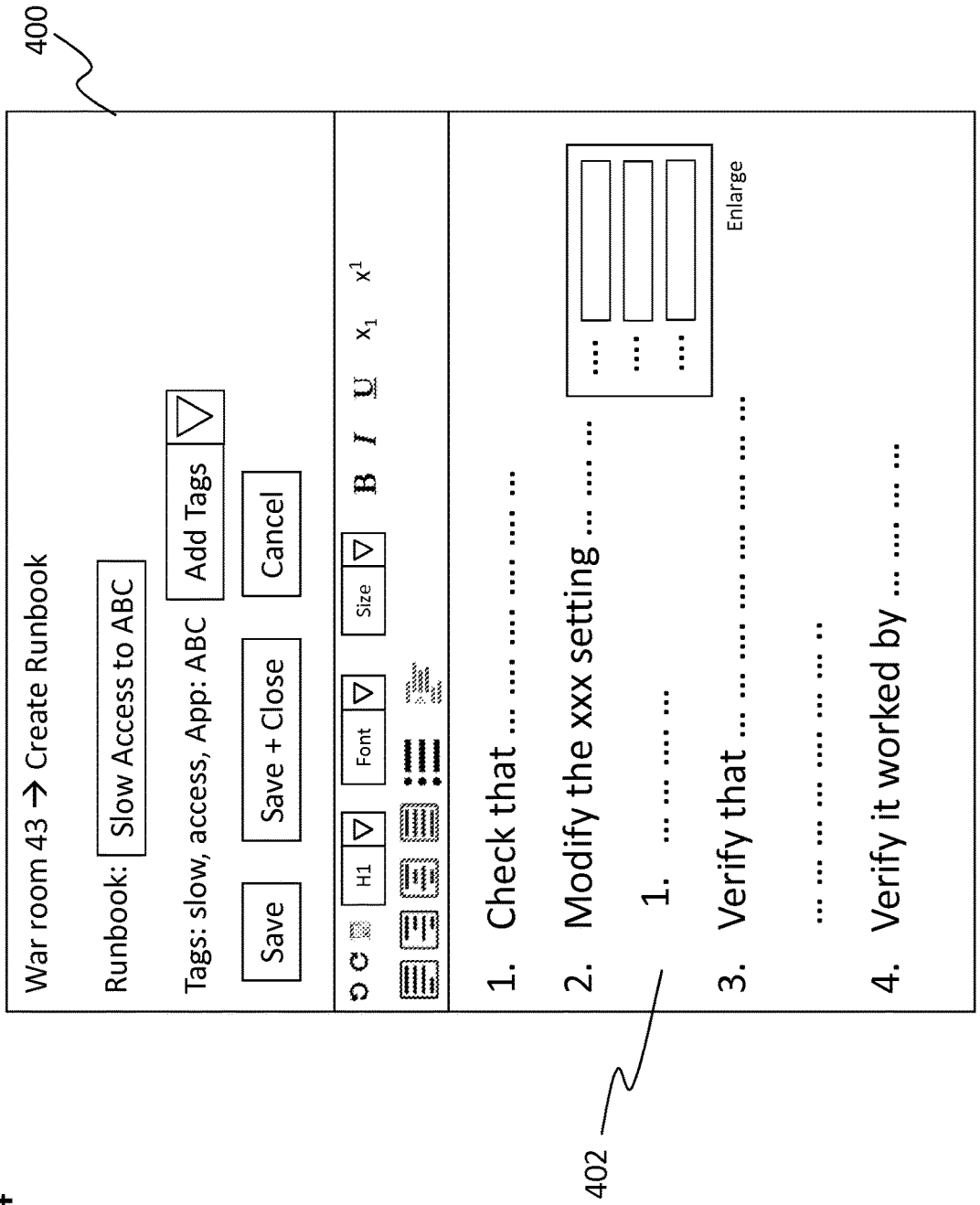
FIG. 4 depicts an illustrative view of a user interface of a runbook in accordance with an embodiment.

Turning now to FIG. 4, a non-limiting example of a runbook generated in accordance with embodiments disclosed herein is shown. Runbook 400 may be a modifiable document, such as a modifiable text document, and may be the output of the algorithm described with respect to FIGS. 3A and 3B. The runbook 400 may automatically generate or include a description of the problem and/or title of the runbook. Further, a listing of the tags/annotations used to generate the runbook 400 may be provided to show what content was selected from the collaborative effort system to generate the runbook. In accordance with some embodiments, the ability to modify the selected tags may be enabled in the runbook 400, i.e., a user may select the tags and/or alter the selected tags that are used to generate the runbook 400. As such, the content of the runbook 400 can be adjusted in an on-going basis depending on the needs of the user.

A runbook content 402 may be presented to the user in a modifiable format in a user interface. As such, a user may be presented with the pre-generated content of the desired runbook, but the user may then edit each entry and/or change the order of steps. For example, a user may remove colloquial language and terms from the runbook content 402, such that it is appropriate for providing a useful runbook to solve a predefined problem. In accordance with some embodiments, the mining of the transcript, i.e., selection of desired information from the tags and extraction thereof could be interactive such that the runbook generation process maintains a reference to the content of the collaborative effort system that the runbook was created from. In this case the user may start initially and select a specific set of tags used to capture into a runbook. Later, the user may change the selected tags/annotations to add additional content where and the additional content is extracted and entered into the runbook content 402.

At this point the runbook 400 can be saved as a final runbook. The final runbook may contain the key intellectual material needed to describe how to resolve a particular given problem. In some embodiments, the final runbook may not be written in a manner where lower skilled persons may use it immediately; however, further editing may be performed to make it easier to follow and to be more user-friendly. As such, embodiments described herein enable the generation or creation of a complete and useable runbook from an active collaboration within a collaborative effort system that is used to solve a problem without requiring significant effort from one or more SMEs. Advantageously, any problem that one or more SMEs participate in solving may be converted to a new runbook, thus improving the ability for lower-skilled persons to solve a higher percentage of problems.

Figure 5:
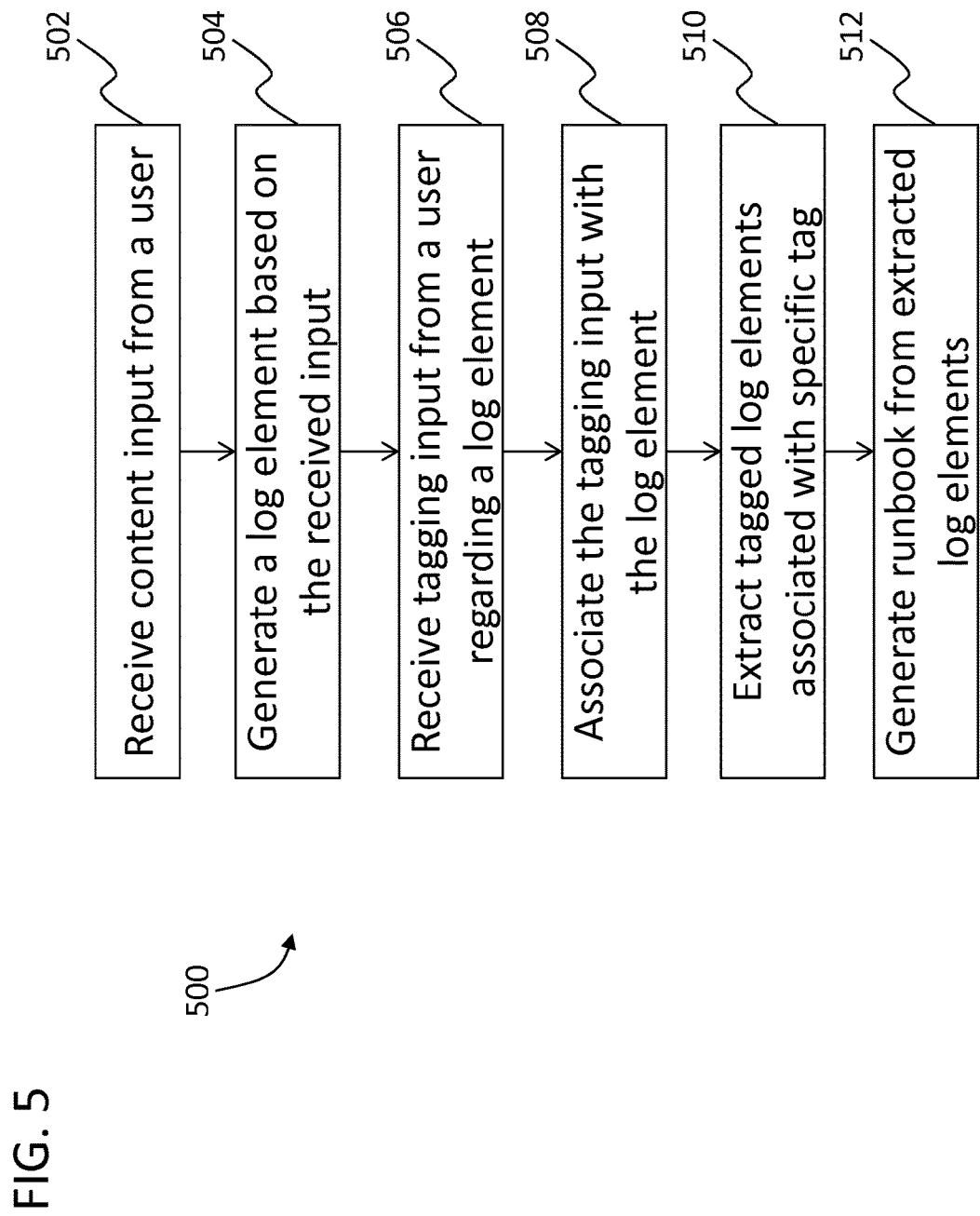
FIG. 5 depicts a flow process for generating a runbook in accordance with an embodiment.

Turning now to FIG. 5, a process flow for generating a runbook in accordance with an embodiment is shown. Process flow 500 may be similar to that described above, and may be implemented on a host system and/or a user system. Process flow 500 may represent the operation of a collaborative effort system that is used by one or more users to solve an identified problem.

A collaborative effort system may receive user input (block 502). The user input may be received from one or more users that are accessing and/or interacting with the collaborative effort system. The input may be converted into a log element (block 504). The log element may be retained by a memory and appropriate characteristics may be associated therewith. For example, the log element may be saved with a time stamp, information regarding the user submitting the content of the log element, and/or other desired and/or predetermined information.

The collaborative effort system may then receive tagging input from a user regarding the log element (block 506). For example, the log element may be displayed to a user, and the user may select tagging information to be associated with the log element, e.g., as described above. The tagging information may then be associated with the appropriate, identified, and/or selected log element (block 508). Blocks 502-508 may be repeated throughout a discussion process that employs the collaborative effort system. The resulting log elements and associated information, both tagged and non-tagged, may be formed into a history, transcript, log, database, etc.

The collaborative effort system may then receive an instruction from a user to extract log elements or filter the collaborative content being displayed only to those elements associated with one or more specific tags (block 510). The collaborative effort system may then compile the extracted and/or filtered log entries into a runbook (block 512). Block 510 and 512 may involve a rule based algorithm, such as shown and described with respect to FIG. 3B. The generated runbook may, in some embodiments, be a modifiable document or file, such as shown in FIG. 4.

Technical effects and benefits include a virtual application configured to enable collaborative work and real-time tagging of information therein, e.g., a collaborative effort system as described above. Further technical effects and benefits include providing tagging and/or annotations to a collaborative effort system (e.g., discussion, war room, chat room, instant messaging, emails, short message service elements, blog entries, website entries, online community entries, news feed items, wild entries, etc.) that may be used to selectively extract tagged elements and/or content. Furthermore, technical effects and benefits include automatically generating a runbook from tagged content. For example, after a problem is identified and solved within a collaborative effort system embodiments described herein may enable the automatic mining of content and subsequent generation of a runbook.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to tag collaborative content to facilitate mining key content as a run book, the method comprising:
   providing a user interface allowing a user to annotate portions of collaborative content in a collaborative effort system, the collaborative content comprising one or more log elements;
   receiving the collaborative content of two or more experts, wherein the collaborative content comprises a plurality of messages generated by the two or more experts while solving a past problem;
   generating a plurality of log elements based on the collaborative content, by dividing the collaborative content into the plurality of log elements, wherein each of the plurality of log elements is an entry in the collaborative content;
   receiving, through the user utilizing the user interface, a selection of one or more log elements in the collaborative content;
   responsive to the user utilizing the user interface to select the one or more log elements in the collaborative content, tagging each selected log elements of the selected one or more log elements with a respective annotation that describes a relevancy of the selected log element to the past problem;
   extracting the selected one or more log elements and respective annotations of the selected one or more log elements; and
   generating automatically a runbook for a future problem related to the past problem, based on the selected one or more log elements and respective annotations, wherein the runbook comprises the selected one or more log elements.

2. The method of claim 1, further comprising:
   receiving input of modifications to the runbook; and
   updating the runbook based on the received modifications.

3. The method of claim 1, wherein a respective annotation of a first log element of the selected one or more log elements identifies at least one of a status, a procedural step, a scope of applicability, and a context.

4. The method of claim 1, further comprising:
   applying a rule-based algorithm to the collaborative content and the selected one or more log elements.

5. The method of claim 4, wherein the rule-based algorithm comprises:
   ordering the collaborative content in a time-ordered sequence;
   forming the selected one or more log elements into the runbook, wherein the selected one or more log elements are arranged in the runbook according to the time-ordered sequence.

6. The method of claim 4, further comprising:
   receiving inputs to adjust the runbook; and
   adjusting the runbook based on the received inputs.

7. The method of claim 1, further comprising:
applying natural language process and analytic analysis to the collaborative content to identify log elements of interest; and
tagging the log elements of interest for approval by a user.

8. A system to tag collaborative content to facilitate mining key content as a run book comprising:
a memory having computer readable instructions; and
a processor configured to execute the computer readable instructions, the computer readable instructions comprising:
providing a user interface allowing a user to annotate portions of collaborative content in a collaborative effort system, the collaborative content comprising one or more log elements;
receiving the collaborative content of two or more experts, wherein the collaborative content comprises a plurality of messages generated by the two or more experts while solving a past problem;
generating a plurality of log elements based on the collaborative content, by dividing the collaborative content into the plurality of log elements, wherein each of the plurality of log elements is an entry in the collaborative content;
receiving, through the user utilizing the user interface, a selection of one or more log elements in the collaborative content;
responsive to the user utilizing the user interface to select the one or more log elements in the collaborative content, tagging each selected log elements of the selected one or more log elements with a respective annotation that describes a relevancy of the selected log element to the past problem;
extracting the selected one or more log elements and respective annotations of the selected one or more log elements; and
generating automatically a runbook for a future problem related to the past problem, based on the selected one or more log elements and respective annotations, wherein the runbook comprises the selected one or more log elements.

9. The system of claim 8, wherein the computer readable instructions further comprise:
receiving input of modifications to the runbook; and
updating the runbook based on the received modifications.

10. The system of claim 8, wherein the computer readable instructions further comprise:
applying a rule-based algorithm to the collaborative content and the selected one or more log elements.

11. The system of claim 10, wherein the rule-based algorithm comprises:
ordering the collaborative content in a time-ordered sequence;
forming the selected one or more log elements into the runbook, wherein the selected one or more log elements are arranged in the runbook according to the time-ordered sequence.

12. The system of claim 8, wherein the computer readable instructions further comprise:
applying natural language process and analytic analysis to the collaborative content to identify log elements of interest; and
tagging the log elements of interest for approval by a user.

13. A computer program product to tag collaborative content to facilitate mining key content as a run book, the computer program product comprising a computer readable storage medium having program instructions embodied therewith, the program instructions executable by a processor to cause the processor to:
provide a user interface allowing a user to annotate portions of collaborative content in a collaborative effort system, the collaborative content comprising one or more log elements;
receive the collaborative content of two or more experts, wherein the collaborative content comprises a plurality of messages generated by the two or more experts while solving a past problem;
generate a plurality of log elements based on the collaborative content, by dividing the collaborative content into the plurality of log elements, wherein each of the plurality of log elements is an entry in the collaborative content;
receive, through the user utilizing the user interface, a selection of one or more log elements in the collaborative content;
responsive to the user utilizing the user interface to select the one or more log elements in the collaborative content, tag each selected log elements of the selected one or more log elements with a respective annotation that describes a relevancy of the selected log element to the past problem;
extract the selected one or more log elements and respective annotations of the selected one or more log elements; and
generate automatically a runbook for a future problem related to the past problem, based on the selected one or more log elements and respective annotations, wherein the runbook comprises the selected one or more log elements.

14. The computer program product of claim 13, the program instructions executable by a processor further configured to cause the processor to:
apply a rule-based algorithm to the collaborative content and the selected one or more log elements.

15. The computer program product of claim 14, wherein the rule-based algorithm comprises:
ordering the collaborative content in a time-ordered sequence;
forming the selected one or more log elements into the runbook, wherein the selected one or more log elements are arranged in the runbook according to the time-ordered sequence.

16. The computer program product of claim 13, the program instructions executable by a processor further configured to cause the processor to:
apply natural language process and analytic analysis to the collaborative content to identify log elements of interest; and
tagging the log elements of interest for approval by a user.

* * * * *